Jan. 8, 1952          O. MAISCH          2,581,537
SELF-SEALING TEST PLUG
Filed July 19, 1949
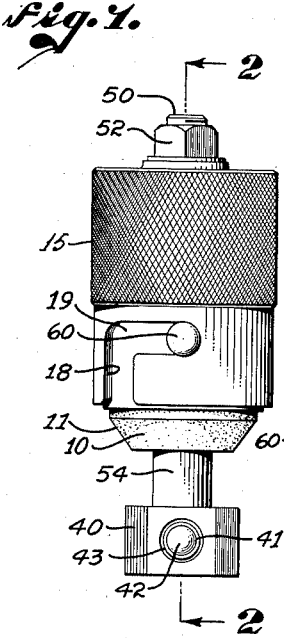
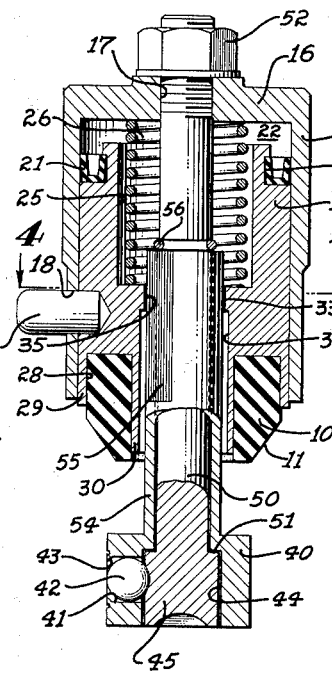
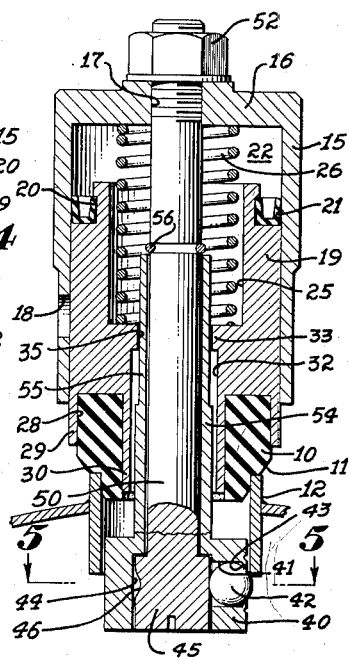
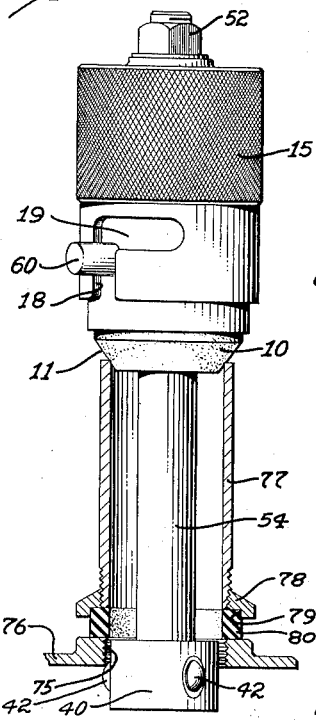
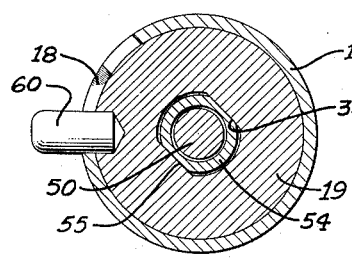
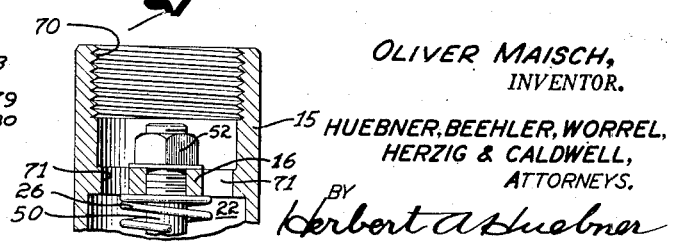
OLIVER MAISCH,
INVENTOR.
HUEBNER, BEEHLER, WORREL,
HERZIG & CALDWELL,
ATTORNEYS.
BY Herbert A. Huebner Patented Jan. 8, 1952

2,581,537

UNITED STATES PATENT OFFICE 2,581,537

SELF-SEALING TEST PLUG

Oliver Maisch, Chicago, Ill., assignor to Rheem Manufacturing Company, Richmond, Calif., a corporation of California Application July 19, 1949, Serial No. 105,527

8 Claims. (Cl. 220—25)

My invention relates to the art of pressure-testing containers designed to hold fluids, and has particular reference to a test plug adapted to seal an open aperture in such container while fluid under pressure is introduced into the container for the purpose of testing.

In the manufacture of pressure containers, such as barrels, drums, conduits and hoses, it is often essential that each individual unit be pressure-tested before distribution to the ultimate user in order to insure that the equipment will not lose its contents by leakage or explode under use and injure any person in the vicinity or damage equipment. Where large quantities of such pressure containers are being produced, the problem of time consumed in sealing the open aperture in order to test the vessel or container becomes important. It is, therefore, one of the objects of my invention to produce a self-sealing test plug which may be readily and quickly inserted into the aperture for sealing purposes and which may be readily and quickly removed therefrom.

In testing pressure-containing equipment, it is necessary to apply a testing pressure several times larger than normally intended to be sure that sufficient safety factor resides in the equipment. The forces in such case tending to blow the test plug from the aperture are considerable. It is also among the objects of my invention to produce a self-sealing test plug which utilizes the pressure being applied inside the container to effect the seal over the aperture so that regardless of the pressure applied, an equal or greater force is exerted against the sealing plug, thereby preventing a blow-out of the plug from the aperture or a leak around the sealing gasket.

I am aware that a great many test plugs and some self-sealing test plugs have been designed and used. However, all of the test plugs of the prior art known to me have been limited in their application in that they are designed either to seal the opening of a thin-walled drum by extending an anchoring member internally of the drum or to seal the open end of a conduit or tubing by engaging the side walls thereof. So far as is known to me, none of these devices are applicable to both types of pressure containers. It is a further object of my invention to provide a self-sealing test plug which is more or less universal in its application and can be used in sealing and testing either thin-walled containers or conduits and tubing.

Other and further objects and advantages of my invention will become apparent from the drawings and the specifications relative thereto.

In the drawings:

Figure 1 is a side elevation of a test plug embodying the principles of my invention.

Figure 2 is an enlarged sectional view taken on line 2—2 of Figure 1.

Figure 3 is a view similar to Figure 2 showing the plug in operating position at the end of a conduit.

Figure 4 is a sectional view taken on line 4—4 of Figure 2.

Figure 5 is a sectional view taken on line 5—5 of Figure 3.

Figure 6 is a fragmentary sectional view showing a modified form of my testing plug.

Figure 7 is a side elevation showing the application of my testing plug to a thin-walled container.

My invention is composed of three essential parts, namely, a sealing means, means for applying pressure to said sealing means, and means for anchoring said plug to said container.

The sealing means comprises an annular resilient ring 10 having a tapered face 11 adapted to engage the open lip of a tubular fitting 12 and to be urged in tight fit thereagainst to prevent the escape of any fluid under pressure contained in the tubing.

The means for applying pressure on the sealing ring 10 comprises a cylindrical housing 15 having a closed end 16, the closed end 16 being formed with a threaded aperture 17 co-axial with the cylindrical housing 15. The cylindrical housing 15 is also formed with an L-shaped notch 18 having a horizontal and a vertical leg.

A piston 19 is disposed within the housing 15 for reciprocation therein. The piston 19 is formed with a peripheral undercut groove 20 adapted to receive a generally U-shaped annular resilient ring 21. It should be understood that the ring 21 is in the nature of a piston ring adapted to prevent the escape of fluid under pressure between the side wall of the piston 19 and the interior of the cylinder 15. The piston 19, the cylinder 15 and the end wall 16 cooperate to define an expandable pressure chamber 22.

The piston 19 is also formed with an axial bore 25 adapted to receive a coil compression spring 26 which abuts against the bottom of the bore 25 and end wall 16, thereby normally urging the piston 19 outwardly with respect to the cylinder 15 to form an initial seal before the application of testing pressures.

An annular groove 28 is formed in the bottom of the piston 19 and defines inner and outer annular walls 29 and 30. The annular groove 28 is adapted to receive the resilient ring 10 in frictional engagement. It is to be understood that the inner annular wall 30 is adapted to support the annular ring 10 from collapsing inwardly upon the application of pressure for sealing purposes.

An axial bore 32 extends inwardly in the piston 19 and is adapted to form a wall 33 between the bottom of the bore 25 and the bore 32. The wall 33 is formed with a non-circular bore 35, the purpose of which will become apparent later.

It will be readily apparent that alternatively the bore 32 can extend inwardly to the bore 25, and that instead of using the non-circular bore 35, diametrically opposed set screws can be inserted through the wall of the piston 19 to contact the flat sides of the cylindrical shaft 54.

The anchoring member comprises an outer shell 40, which said shell is formed with a plurality of radial bores 41 adapted to receive cam followers, such as balls 42. The outer edges of the bores 41 are peened or upset, such as at 43, to prevent the balls 42 from falling from said bores.

The shell 41 is formed with an axial bore 44 adapted to receive a cam head 45. The cam head 45 is formed with a plurality of cam surfaces 46 adapted to receive a portion of the ball 42 when in proper position. It will be readily understood that respective rotation between the cam head 45 and the shell 40 will cause the cam followers to move outwardly from the cam surfaces 46, as is shown in Figure 5, thereby expanding the effective diameter of the anchor head.

The cam head 45 is formed with a shaft 50 having a reduced diameter, thereby defining a shoulder 51. The upper end of the shaft 50 is threaded and adapted for threaded engagement in the bore 17, which said engagement together with a lock nut 52 prevents rotation of the cam head with respect to the housing 15.

The shell 40 is formed with an upwardly extending cylindrical shaft 54 co-axial with the shaft 50, which said shaft is formed with a non-circular end 55 complementary with the non-circular aperture 35 and is adapted to be slidably disposed therethrough and held in position by snap ring 56. It, therefore, becomes apparent that the piston 19 can reciprocate with respect to the shell 40, but may not rotate with respect thereto.

Therefore, rotation of the piston 19 with respect to the cylindrical housing 15 will cause a rotation of the cam head 45 with respect to the shell 40, which said rotation will cause an expansion of the balls 42, thereby engaging or anchoring against the end wall of flange, tube or fitting.

Means is provided for guiding such rotation between the piston 19 and the cylinder 15. Such means comprises a pin 60 adapted to extend outwardly from said piston 19 through the L-shaped slot 18.

It will, therefore, readily be seen that the anchoring head of the shell 40 can be inserted into an opening whereupon the pin 60 is rotated in the slot 18 until it reaches the vertical leg. The rotation of the pin 60 in the slot 18 causes the expansion of the balls 42 outwardly to engage the end of the sleeve or tubular fitting 12. The compression spring 26 causes a movement of the piston 19 longitudinally outward from the cylindrical housing 15 to cause engagement between the sealing ring 10 and the upper periphery of the fitting 12.

It will be noted that clearance is provided between the piston 19 and the shaft 54, so that any pressure applied inside of the tubular fitting 12 will be transmitted through the passage defined by this clearance of the interior of the chamber 22 where pressure will further tend to cause separation between the top 16 and the piston 19, so that as the pressure is increased in the tubular fitting 12, the pressure downwardly on the sealing member 10 will be increased.

In the modification illustrated in Figure 6, similar numerals to those shown in Figures 1–3, inclusive, indicate similar parts. The principal modification lies in the fact that the cylindrical housing 15 extends upwardly past the end wall 16 and is threaded internally as at 70 adapted to receive a pressure hose. The end wall 16 is formed with a plurality of apertures 71 to permit the passage of fluid under pressure into the chamber 22 to effect a sealing engagement with the top of the tubular fitting 12 and also to permit the passage of said fluid from the chamber 22 into the interior of the tubular fitting 12 through the clearance between the shaft 54 and the piston 19.

Figure 7 illustrates my test plug in use for sealing an aperture in a relatively thin-walled container. In Figure 7 I have illustrated the expandable head as being inserted through a threaded aperture 75 of a thin-walled vessel 76. A tubular member 77 is axially disposed with respect to the shaft 54 and is provided with a peripheral shoulder 78 having an internal annular undercut groove 79 adapted to receive a resilient gasket 80. The resilient gasket 80 is adapted to engage the upper surface of the container immediately surrounding the aperture 75 for sealing said aperture against the escape of fluid under pressure in the container.

The upper rim of the tubular member 77 is adapted to abut against the angular face 11 of the resilient ring 10.

The expandable head member is first inserted through the aperture 75 and the pin 60 is rotated in the slot 18 with respect to the housing 15, thereby causing a rotation between the shell member 40 and the cam head 45 causing the balls 42 to move outwardly. When the balls 42 have moved to their outer extreme limits, they define a circle having a diameter larger than the diameter of the aperture 75 so that the cam or expandable head cannot be withdrawn through the aperture 75. Pressure is then applied in the manner above described causing the piston 19 to move downwardly with respect to the housing 15 to effectively seal both the upper and lower ends of the tubular member 77. It will readily be apparent that as greater pressures are applied internally of the vessel, a greater force will be applied to the sealing of both ends of the tubular member 77 because the pressure contained in the vessel is communicated into the chamber 22 and the effective area of the piston 19 is larger than the effective area of the sealing member 10 exposed to the pressure inside of the tubular member 77.

While I have herein shown and described my invention in what I have conceived to be the most practical and preferred embodiment, it is recognized that departures may be made therefrom within the scope of my invention, which is not be limited to the details disclosed herein, but is to be accorded the full scope of the claims so as to embrace any and all equivalent devices.

Having described my invention, what I claim as new and desire to secure by Letters Patent is:

1. In a self-sealing test plug adapted to seal an aperture in a container during pressure-testing thereof, said test plug having a piston and cylinder assembly defining an expandable pressure chamber, resilient sealing means disposed on said piston adapted to engage the peripheral edges of said aperture to seal said aperture against the escape of fluid under pressure, and holding means adapted to engage the inside of said container to hold said test plug in sealing relation with respect to said aperture, the element of novelty residing in said holding means and comprising a cam secured to said cylinder, a plurality of cam followers adapted to be radially displaced into expanded or contracted position upon rotation of said cam with respect to said cam followers, and means slidably but non-rotatably associated with said piston adapted to restrain displacement of said cam followers circumferentially about the axis of said cam upon rotation of said cylinder with respect to said piston.

2. In a self-sealing test plug adapted to seal an aperture in a container during pressure-testing thereof, said test plug having a piston and cylinder assembly defining an expandable pressure chamber, resilient sealing means disposed on said piston adapted to engage the peripheral edges of said aperture to seal said aperture against the escape of fluid under pressure, and means adapted to engage the inside of said container to hold said test plug in sealing relation with respect to said aperture, the elements of novelty including said holding means and comprising a cam secured to said cylinder, a plurality of cam followers adapted to be radially displaced into expanded or contracted position upon rotation of said cam with respect to said cam followers, means slidably but non-rotatably associated with said piston adapted to restrain displacement of said cam followers circumferentially about the axis of said cam upon rotation of said cylinder with respect to said piston, and means associated with said piston adapted to guide rotation of said piston with respect to said cylinder.

3. In a self-sealing test plug adapted to seal an aperture in a container during pressure-testing thereof, said test plug including a pair of members, one a cylinder, the other a piston therein defining an expandable pressure chamber, resilient sealing means disposed on one of said members adapted to engage the peripheral edges of said aperture to seal said aperture against the escape of fluid under pressure, and means adapted to engage the inside of said container to hold said test plug in sealing relation with respect to said aperture, the elements of novelty including said holding means and comprising a cam secured to the other of said members, a plurality of cam followers adapted to be radially displaced into contracted or expanded position upon rotation of said cam with respect to said cam followers, means slidably but non-rotatably associated with said one member adapted to restrain displacement of said cam followers circumferentially with respect to said one member upon rotation of said cam, means associated with said members to guide rotation of one member with respect to the other member, and resilient means disposed between said members adapted to cause axial displacement of said piston with respect to said cylinder after said cam followers have reached maximum expanded position for initially sealing said aperture before the application of pressure thereto.

4. A self-sealing test plug adapted to seal an aperture in a container during pressure-testing thereof comprising a piston and cylinder assembly defining an expandable pressure chamber, said piston being formed with inner and outer concentric annular walls at the outer end thereof defining an annular groove, resilient sealing means disposed in said annular groove and adapted to engage the peripheral edges of said aperture to seal said aperture against the escape of fluid under pressure, means adapted to engage the inside of said container to hold said test plug in sealing relation with respect to said aperture, said holding means comprising a cam secured to said cylinder, a plurality of cam followers adapted to be radially displaced into expanded and contracted position upon rotation of said cam with respect to said cam followers, means slidably but non-rotatably associated with said piston adapted to restrain displacement of said cam followers circumferentially about the axis of said cam upon rotation of said cam, means associated with said piston adapted to guide rotation of said piston with respect to said cylinder, and resilient means disposed between said piston and cylinder adapted to cause axial displacement of said piston with respect to said cylinder after said cam followers have reached maximum expanded position for effecting an initial seal between said sealing means and the peripheral edges of said aperture before the application of testing pressure thereto.

5. A self-sealing test plug adapted to seal an aperture in a container during pressure-testing thereof, said test plug having a piston and cylinder assembly defining an expandable pressure chamber, said piston being formed with inner and outer concentric annular walls at the outer end thereof defining an annular groove, said inner wall being relatively higher than said outer wall, resilient sealing means disposed in said annular groove adapted to engage the peripheral edges of said aperture to seal said aperture against the escape of fluid under pressure, means adapted to engage the inside of said container to hold said test plug in sealing relation with respect to said aperture, said holding means comprising a cam secured to said cylinder, a plurality of cam followers adapted to be radially displaced into expanded or contracted position upon rotation of said cam with respect to said cam followers, means slidably but non-rotatably associated with said piston adapted to restrain displacement of said cam followers circumferentially about the axis of said cam upon rotation of said cam, and means associated with said piston to guide rotation of said piston with respect to said cylinder.

6. A plug for sealing an aperture having inner and outer edges in a container during fluid pressure-testing comprising an anchor member formed with a head adapted to be inserted through the aperture and to be expanded after insertion to engage the inner edge of the aperture, a resilient annular gasket around said anchor member, said annular gasket having an outside diameter larger than the diameter of the aperture and adapted to be compressed against the outer surface of the container adjacent the periphery of the aperture, a housing having relatively movable end elements defining an expandable pressure chamber, said anchor member being secured to one of said end elements, said gasket being secured to the other of said end elements, means defining fluid communication between said container and said chamber whereby fluid pressure introduced into the container will cause relative movement of the end elements and urge said gasket and the head of said anchor member together to effect a pressure seal across the aperture, said anchor member comprising a cam member having camming surfaces thereon and a cam follower associated with each of said camming surfaces adapted to be expanded upon relative rotation between said cam member and said cam followers.

7. A plug for sealing an aperture having inner and outer edges in a container during fluid pressure-testing comprising an anchor member formed with a head adapted to be inserted through the aperture and to be expanded after insertion to engage the inner edge of the aperture, a resilient annular gasket around said anchor member, said gasket having an outside diameter larger than the diameter of the aperture and adapted to be compressed against the outer surface of the container adjacent the periphery of the aperture to effect a sealing engagement therewith, a housing having relatively movable end elements defining an expandable pressure chamber, said anchor member being secured to one of said end elements, said gasket being secured to the other of said end elements, and means defining fluid communication between said container and said chamber whereby fluid pressure introduced into the container will cause relative movement of the end elements and urge said gasket and the head of said anchor member together to effect a pressure seal across the aperture, said anchor member comprising a substantially cylindrical head having an axial bore therein and a plurality of radial bores intersecting said axial bore, a cam head rotatably disposed in said axial bore and non-rotatably secured to one of said end elements, a cam follower reciprocally disposed in each of said radial bores, said cam head being formed with a cam surface adapted to cooperate with each of said cam followers, and means associated with the end element other than the one mounting said cam head adapted to cause rotation of said cam followers with respect to said cam, thereby causing expansion of said head.

8. A plug for sealing an aperture in a container during fluid pressure testing comprising in combination: an anchor member adapted to be inserted through the aperture and including expandable means and an axial, rotatable member effective to actuate said expandable means, thereby to effect an expansion of the inner end of said anchor member so that said inner end may engage the inside of the container and prevent movement of the plug away from the aperture, an annular gasket disposed around said anchor member adapted to bear against the container circumjacent the aperture and seal the aperture against escape of fluid, a housing having relatively movable walls defining an expansible pressure chamber, said anchor member being secured to one of said walls, said gasket being secured to the other of said walls, and a fluid passageway disposed to communicate between the container and said chamber to admit fluid under pressure from the container into the chamber, thereby expanding said chamber and pressing said gasket into firm engagement with the container.

OLIVER MAISCH.

REFERENCES CITED

The following references are of record in the file of this patent:

UNITED STATES PATENTS

| Number | Name | Date |
| --- | --- | --- |
| 413,737 | Shelton | Oct. 29, 1889 |
| 686,387 | Cogswell | Nov. 12, 1901 |
| 1,202,704 | Goff | Oct. 24, 1916 |
| 1,531,325 | White | Mar. 31, 1925 |
| 1,560,489 | Yager | Nov. 3, 1925 |
| 2,037,347 | Shoop | Apr. 14, 1936 |